Patented Sept. 4, 1923.

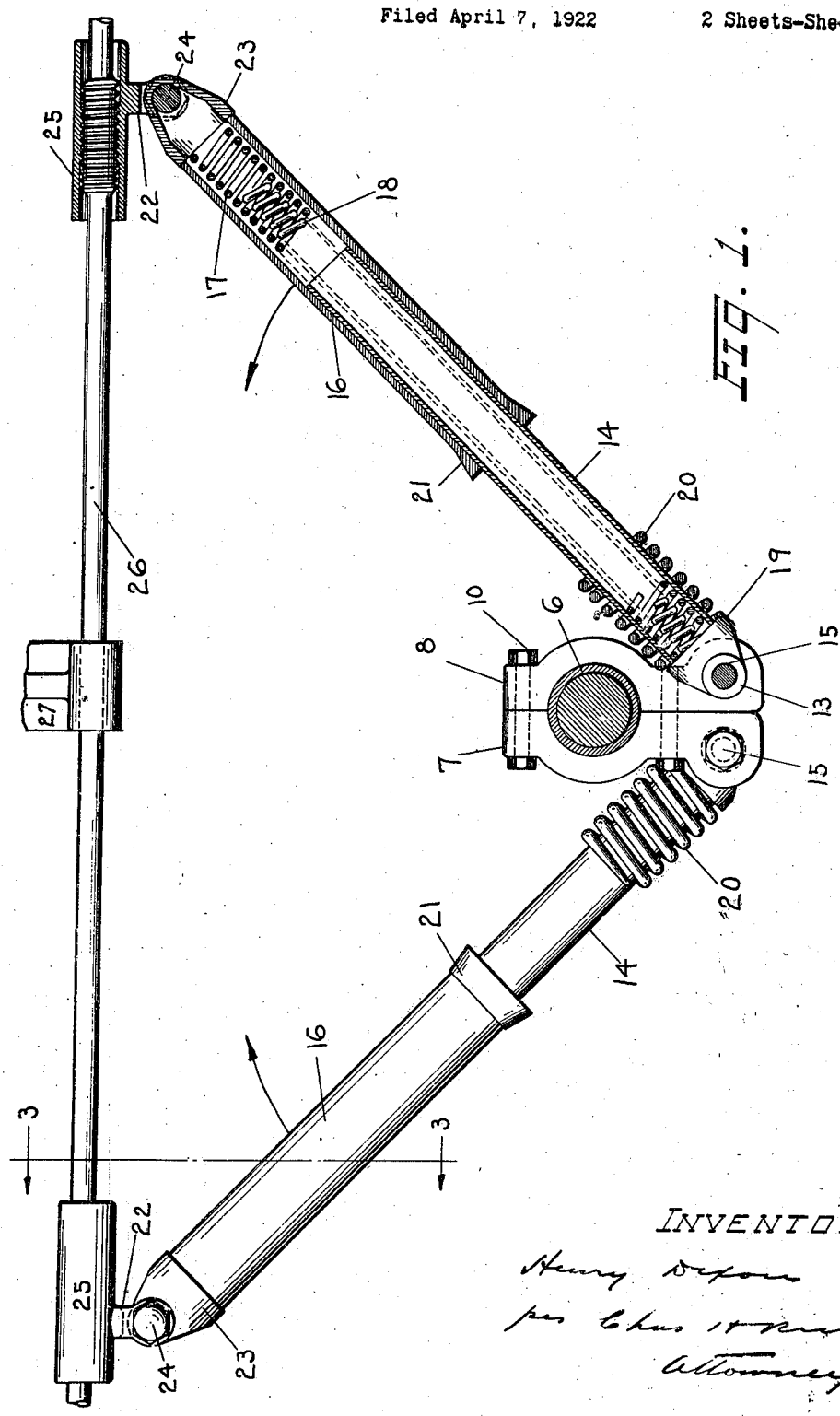

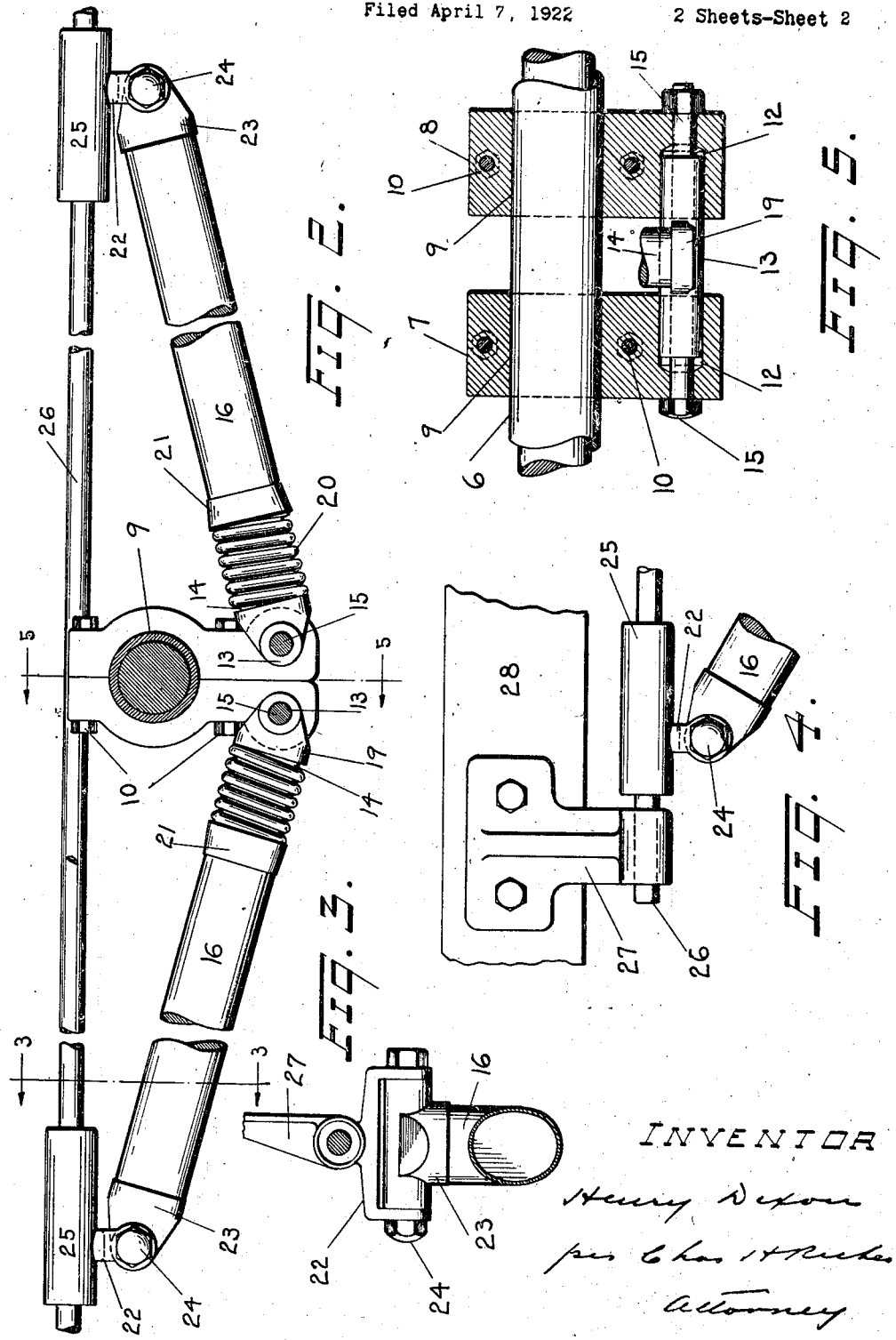

1,466,817

UNITED STATES PATENT OFFICE.

HENRY DIXON, OF COLLINGWOOD, ONTARIO, CANADA.

VEHICLE SPRING.

Application filed April 7, 1922. Serial No. 550,414.

*To all whom it may concern:*

Be it known that I, HENRY DIXON, of the town of Collingwood, in the county of Simcoe and Province of Ontario, Dominion of Canada, have invented certain new and useful Improvements in Vehicle Springs; and I hereby declare that the following is a full, clear and exact description of the same.

The present invention consists broadly of an obliquely arranged pair of springs, contained in an obliquely arranged pair of telescopic housings, provided with adjustable means for increasing or decreasing the angle of convergence at will and regulating the force of the initial pressure which the springs exert against the load.

In the preferred construction, each tubular housing is composed of telescopic members, and in each housing is contained a pair of coiled springs of different lengths, the longer spring of each pair continually exerting its force against said members and the shorter spring exerting its force against said members when the longer spring is compressed to an extent equal to or greater than the difference of their respective lengths.

One member of each of the telescopic housings is hinged to an axle bracket and the other member of each telescopic housing is provided with an internally threaded sleeve through which operates a screw-threaded rod for increasing or decreasing the angle of convergence of said housings and thereby regulating the initial pressure exerted by said springs against the load.

Encircling each housing is a buffer spring exerting its force on said members when the first mentioned springs are compressed.

For an understanding of the invention reference is to be had to the following description and accompanying drawings, in which:

Fig. 1 is a sectional elevational view showing a pair of springs arranged at a substantially right-angle to each other, Fig. 2 is an elevational view showing the position of the parts when the springs are under extreme compression, Fig. 3 is an end sectional elevational view taken on the line 3—3 of either Fig. 1 or Fig. 2.

Fig. 4 is a fragmentary side elevational view of the construction shown in Fig. 3, and Fig. 5 is a cross-sectional view on the line 5—5 Fig. 2.

Like characters of reference refer to like parts throughout the specification and drawings.

For explanatory purposes the device is hereinafter described and shown in the accompanying drawings in connection with the rear axle housing of a motor vehicle, and for this purpose brackets 7 and 8 are clamped upon the housing 6, each bracket consisting of a pair of corresponding members having a bore 9 to receive said housing. The members of each of the brackets 7 and 8 when assembled, embrace the housing 6 as shown in Figs. 1 and 2, and are rigidly clamped in position by clamping bolts and nuts 10 passing through the members of each bracket. Extending inwardly from the inner surface of each of the brackets 7 and 8 is a bore 12 in which is contained the boss 13 of the tubular member 14 and passing through the brackets 7 and 8 and through the boss 13 is a bolt 15 which forms a journal on which the telescopic housing oscillates.

Each telescopic housing consists of two tubular members 14 and 16 telescopically arranged as shown in Fig. 1. The tubular member 14 is formed with the boss 13 by means of which and the journal bolt 15, the telescopic housing is oscillatingly connected to the brackets 7 and 8. Contained within each telescopic housing are two coiled springs 17 and 18. As shown in Fig. 1, the spring 17 is of greater length than the spring 18 and this spring 17 continually exerts its force against the tubular members 14 and 16 when the stress upon the device is not sufficient to fully compress the spring 17. When the stress upon the device is sufficient to compress the spring 17 to an extent equal to or greater than the difference of the respective lengths of the springs, the spring 18 then exerts its force against said members and assists the spring 17 in resisting the compression.

The tubular member 14 is formed with the collar 19 in the vicinity of the boss 13 and encircling the tubular member 14 is a buffer spring 20 bearing at one end against the collar 19. The inner end of the tubular member 16 is formed with a collar 21. When the springs 17 and 18 are compressed to an extent which brings the collar 21 into contact with the buffer spring 20, the latter resists the contracting movement of the tubular member 16 and assists the springs 17 and 18 in resisting the compression. As shown in Figs. 1 and 2, the two tubular housings and their respective springs are hingedly connected to the brackets 7 and 8 and these housings and their respective springs converge at their hinge connections when the housings are set obliquely to the perpendicular axis of the axle housing. At the upper ends of each of the tubular members 16 is a yoke 22 straddling the cap 23 of its respective member and passing through the cap 23 and the yoke 22 is a bolt 24 upon which the yoke pivots. Integrally formed with each yoke 24 is a sleeve 25, the axis of which is at right angles to the axis of the bolt 24. The bores of the sleeves 25 are in axial alignment and are screw-threaded as shown in Fig. 1, and operating through the sleeves 25 is an adjusting rod 26, screw-threaded to mesh with the screw-threads in the bores of the sleeves 25. By turning the adjusting rod 26 in one direction the tubular housings are moved towards the perpendicular as shown by arrow in Fig. 1, and by turning it in the opposite direction they are moved away from the perpendicular. This adjustment of the convergence or obliquity of the tubular housings regulates the initial pressure exerted by the springs 17 and 18 against the weight of the load.

When the tubular housings with their contained springs approximate a perpendicular position the springs 17 and 18 exert their maximum force against the load and as they move away from the perpendicular their force decreases as the angle of convergence increases, and if they could be moved to a horizontal position their sustaining force would be negligible.

In the use of the device, the operating rod 26 is turned to adjust the angle of convergence of the housings until the flexion of the springs 17 and 18 is sensitive to the load which the device is sustaining so that they will exert an initial pressure against the load of sufficient force to sustain it without any noticeable degree of compression. Under the influence of concussion resulting from the movement of the load, the springs will yield and if the impact of the concussion is sufficient to compress the springs 17 and 18 until the collars 21 engage the buffer springs 20, these latter springs will assist the springs 17 and 18 in resisting further compression.

As shown in Fig. 4, bearing brackets 27 are connected to the body frame 28 of the chassis to loosely contain the ends of the adjusting rod 26, and together with the brackets 7 and 8 couple the spring device to the chassis. An additional bracket 27 may encircle the adjusting rod 26 between the sleeves 25 if it is found advisable to use this additional bearing.

When the device is free from stress, the tubular housings and the springs approximate the perpendicular. When stress is applied to the device, the tubular housings telescopically contract and compress the springs 17 and 18, and during the contraction, move away from the perpendicular towards the horizontal, thereby decreasing the direct pressure of the springs upon the load in substantially the same ratio as the increase of tension resulting from the compression. This has the effect of enabling the springs to exert a pressure of substantially constant force against the load during the bound and rebound of the springs and the maintenance of this pressure eliminates to a large extent the shocks upon the load and the apparatus.

Having thus fully described my invention, what I claim as new and desire to secure by Letters Patent is:—

1. The hereindescribed device comprising a pair of tubular housings each composed of telescopic members, means to which said housings are hingedly connected, two springs within each of said housings, one of which is of greater length than the other, the longer spring continually exerting its force against said members, and the shorter spring exerting its force against said members when the longer spring is compressed to an extent equal to or greater than the difference of their respective lengths, adjustable means connecting said housings for varying their angles of convergence at will and thereby regulating the initial pressure exerted by said springs against the weight of the load, and a buffer spring exterior to each of said housings and exerting its force on said members when the first mentioned springs are compressed.

2. The hereindescribed device comprising a pair of tubular housings each composed of telescopic members, means to which said housings are hingedly connected, two springs within each of said housings, one of which is of greater length than the other, the longer spring continually exerting its force against said members, and the shorter spring exerting its force against said members when the longer spring is compressed to an extent equal to or greater than the difference of their respective lengths, internally threaded sleeves pivotally connected to said housings in axial alignment, a screw-threaded rod adjustable through said sleeves for increasing or decreasing the angle of convergence of said housings at will and thereby regulating the initial pressure exerted by said springs against the weight of the load, and buffer springs exterior to said housings and exerting their force against said members when the first mentioned springs are compressed.

Dated at the city of Toronto, this 18th day of March, A. D. 1922.

HENRY DIXON.

Witnesses:
  STANLEY RICHES,
  GEO. H. RICHES.